United States Patent [19]

Vansteelant

[11] 4,309,051

[45] Jan. 5, 1982

[54] KNOTTER APPARATUS WITH SHEARPLATE FOR ROTARY KNIFE

[75] Inventor: Marc G. Vansteelant, Zedelgem, Belgium

[73] Assignee: Sperry Corporation, New Holland, Pa.

[21] Appl. No.: 161,627

[22] Filed: Jun. 20, 1980

[30] Foreign Application Priority Data

Jun. 22, 1979 [GB] United Kingdom ............... 21877/79

[51] Int. Cl.³ ............................................ A01D 59/04
[52] U.S. Cl. ............................................ 289/2; 289/14
[58] Field of Search .................... 289/2, 10, 13, 14; 83/592, 594, 902, 673–676

[56] References Cited

U.S. PATENT DOCUMENTS

| | | | |
|---|---|---|---|
| 744,153 | 11/1903 | Appleby | 289/14 |
| 2,763,501 | 9/1956 | Rudeen | 289/10 |
| 3,508,776 | 4/1970 | Grillot | 289/14 |
| 3,510,160 | 5/1970 | Bornzin | 289/14 |
| 3,570,354 | 3/1971 | Grillot | 289/14 X |
| 3,773,361 | 11/1973 | Dykstra | 289/14 |
| 4,023,837 | 5/1977 | Pierce | 289/13 |
| 4,161,097 | 7/1979 | Vansteelant | 289/2 X |

Primary Examiner—Louis Rimrodt
Attorney, Agent, or Firm—James R. Bell; Frank A. Seemar

[57] ABSTRACT

The problem of debris fouling of knife edges causing sloppy cutting of baling twine is limited by providing a knotter apparatus including a rotating shear plate. A knife has a cutting edge in knife sharpening engagement with the plate. A groove formed between the cutting edge and the shear plate permits debris to be removed from between the knife and the plate.

7 Claims, 9 Drawing Figures

KNOTTER APPARATUS WITH SHEARPLATE FOR ROTARY KNIFE

BACKGROUND OF THE INVENTION

This invention relates generally to harvesters and more particularly to knotter types for raking and bundling.

In conventional crop balers, hay straw and similar crop material that has been previously cut, windrowed or swathed, is picked up from the ground by a pick-up unit and fed in successive batches or charges into an elongated bale chamber in timed sequence with a reciprocating plunger. The plunger compresses the material into bales and, at the same time, gradually advances the bales towards the outlet of the bale chamber. The bales reach a predetermined length, as determined by a metering device, and a knotter is actuated which wraps cord, twine or other flexible tie material around the bale and secures the ends of the material together.

In a typical baler, a knotter is mounted on the bale chamber above a slot therein, the knotter comprising a twine holder from which twine extends to encircle a bale. During the baling operation, the leading strand of twine is held by the twine holder and extends forwardly across a twine retainer finger and a billhook and then in front of the bale. The twine retainer finger supports the strand so that it does not bear forcefully against the billhook. A needle is involved in completing the encirclement of twine around the bale and when advancing, the needle lays a trailing strand across the twine retainer finger, billhook and twine holder. A twine finger captures these strands of twine and positively positions the strands against the heel of the billhook. Thus, there is presented in a certain zone a pair of twine portions or strands lying alongside each other and these portions are twisted into a bight by the billhook and a portion thereof is pulled through the bight to form a double overhand knot. On completion of the operation of the knotter, the twine finger returns to the initial position. The removal of the tied knot from the billhook involves mechanical stripping by a movable member which normally includes a knife operable to cut the twine from the twine supply so that the tied bale is complete in itself. The tying mechanism thus includes several components working in precisely timed relationship so that theoretically the mechanism ties one knot for each bale and prepares the twine for the succeeding bale.

A knotter is inherently a relatively complicated structure, and the precisely timed operation thereof suffers at times from faulty operation. This may be due to the vibrations of the baler, the tension in the twine and the jarring of the baler as it moves through the field. The crop may be tough or resilient causing the strands of twine to jump about. Variations in the baling twine also affect the knotting operation. Balers are operated, and often left standing in a field whereby the knotter is exposed to all weather conditions. Also, the knotter is subjected to dirt, crop and debris resulting in abrasion and interference of the operation.

Knotters have limitations, one of which is that the twine cutting operation is sometimes less than positive with the result that ragged knot ends may be produced, which may adversely affect the knot. Sometimes the twine may be only partially cut, whereby the operation of the knotter can be impaired. This problem arises because the knife is fixed and hence cutting always takes place at the same point on the knife edge which, therefore, becomes blunt relatively quickly. This problem also arises because the knife cooperates with a shear surface provided by the twine holder, which surface is difficult and expensive to achieve with the objective of ensuring that it operates effectively in conjunction with the knife. Also, debris sometimes reduces the effective cutting ability of such knives.

The foregoing illustrates limitations of the known prior art. Thus, it is apparent that it would be advantageous to provide an alternative directed to overcoming one or more of the limitations as set forth above.

SUMMARY OF THE INVENTION

In one aspect of the present invention, this is accomplished by providing a knotter apparatus including a twine holder having a plurality of rotating twine discs. A shear plate is connected to rotate with the twine discs. A knife is connected to the twine holder having a cutting edge in knife sharpening relationship with the plate. A plurality of cleaning grooves are provided between the shear plate and the cutting edge.

The foregoing and other aspects will become apparent from the following detailed description of the invention when considered in conjunction with the accompanying drawings. It is to be expressly understood, however, that the drawings are not intended as a definition of the invention but are for the purpose of illustration only.

DESCRIPTION OF THE PREFERRED EMBODIMENT

Figure 1:
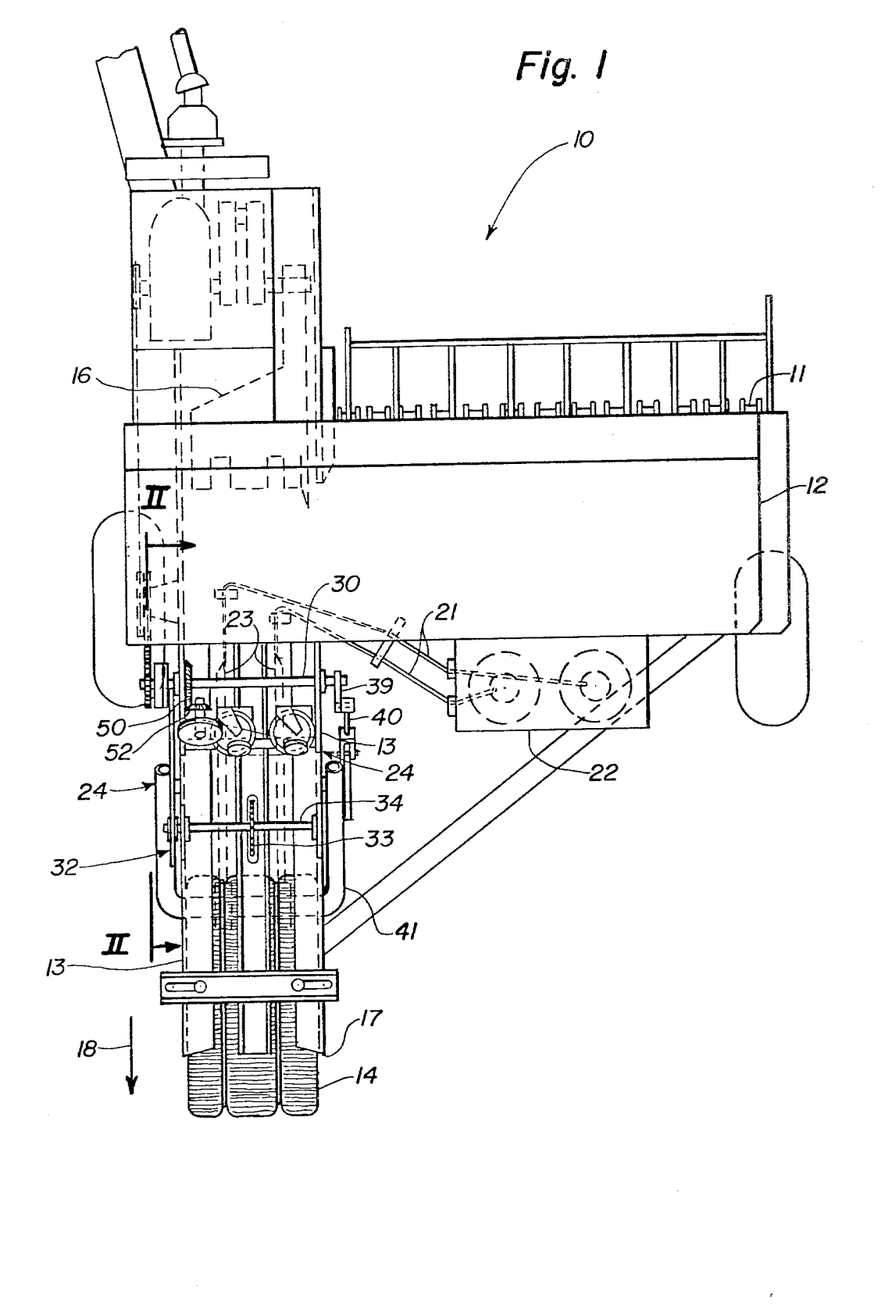
FIG. 1 is a top view illustrating a baler including an embodiment of the knotter apparatus of this invention.
Figure 2:
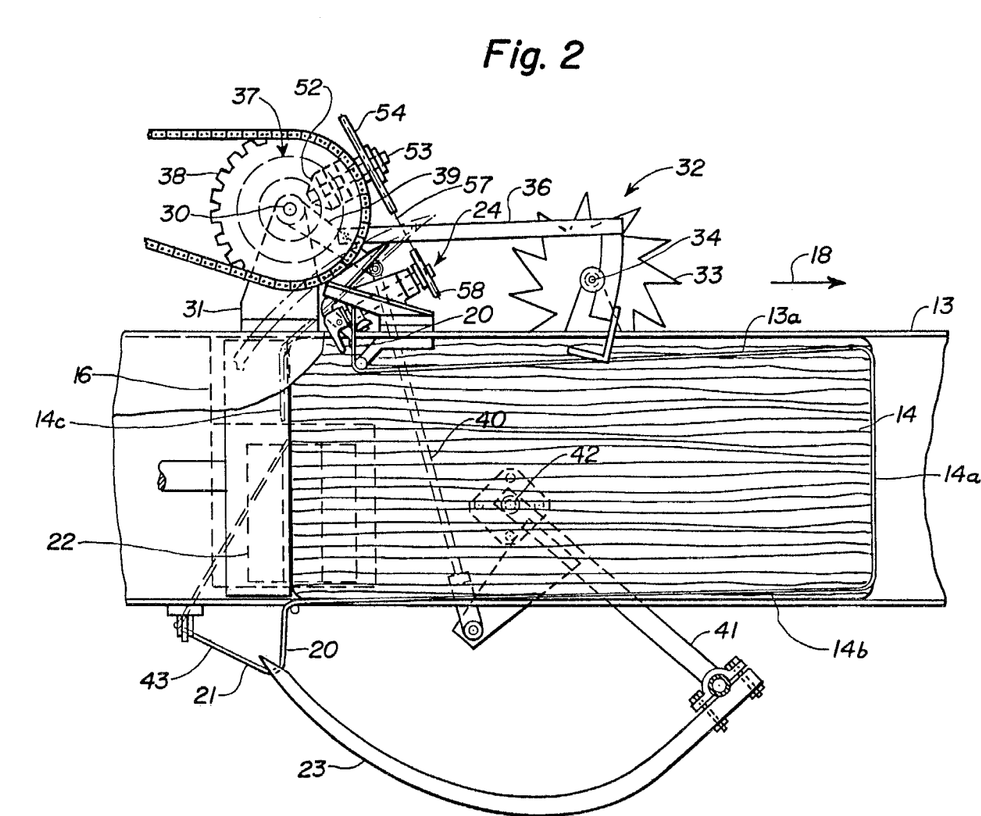
FIG. 2 is a sectional view taken along line II—II of FIG. 1.

According to an aspect of the present invention, a typical agricultural baler, generally designated 10, is shown in FIGS. 1 and 2 to include a wheel-supported chassis upon which are mounted a pick-up mechanism 11 in combination with a feeder mechanism 12 and a bale chamber 13. As cut crop material is picked up from the ground, it is fed in successive batches or charges into the inlet of the bale chamber 13 and the batches of material are compressed into bales 14 by a reciprocating plunger 16 which also advances the bales along the chambr 13 toward an outlet 17 in the direction of arrow 18.

As can perhaps best be seen in FIG. 2, a primary portion or length 20 of twine or flexible material 21 extends across the bale chamber 13 in the path of the leading end 14a of each bale 14 from a supply reel or container 22 and passes through the eye of a needle 23 with the primary portion 20 of the twine 21 being held in a knotter 24 mounted on a top wall 13a of the bale chamber 13. The baler carries a pair of identical knotters 24 arranged to cooperate with a needle 23, whereby a pair of needles also has to be provided.

A main drive shaft 30 (FIGS. 2, 6 and 7) is rotatably journalled in a support 31 on the upper wall 13a of the bale chamber 13 at a distance thereabove and transversely of the bale chamber. The main drive shaft 30 is intermittently actuated by a conventional trip mechanism 32 which includes a starwheel 33 arranged to engage the bale of hay or other material as it is being formed, whereby it is rotated about a shaft 34 as the bale 14 moves along the bale chamber 13. The shaft 34 is operatively coupled to a trip lever 36 which itself is connected to a clutch mechanism 37 mounted on the main shaft 30. One half of the clutch mechanism 37 is driven continuously through a chain or sprocket drive transmission from an intermediate shaft on the baler, only a sprocket 38 thereof being shown in FIGS. 2 and 6. The diameter of the starwheel 33 and the transmission ratio between the shaft 34 and the trip lever 36 allow the formation of a bale of predetermined length before the trip mechanism actuates the clutch mechanism 37, whereupon the main shaft 30 is driven to initiate the tying of a knot by each knotter 24. The main shaft 30 has a crank arm 39 attached thereto at its end opposite to the clutch mechanism 37, the arm 38 being connected by a pitman or link 40 to a needle frame 41 which carries the pair of needles 23. The needle frame 41 is pivotally mounted on the bale chamber 13 by bearings 42. The bale chamber 13 has a pair of longitudinal slots in its lower and upper walls for accommodating the needles 23 when pivoted to their full throw positions.

No further elaboration will be given concerning the structural details of the trip mechanism 32 and the needle frame and drive mechanism as these details are sufficiently well known in the art, however, the operation thereof is briefly summarized below. Upon actuation of the clutch mechanism 37, the main shaft 30 is driven, and the needles 23 move from the rest position (indicated by full lines in phantom lines in FIG. 2) to wrap the respective twines 21 around the bottom 14b and trailing end 14c of the bale 14 and place the secondary portions 43 of the twines 21 in the respective knotters 24. Each twine 21 loops back over the needle 23 to the reel 22 in the full throw position, thereby leaving a new primary portion or length 20 of twine 21 across the path of the next bale to be formed. As each needle 23 returns to its rest position, the ends of each primary and secondary portion, 20 and 43, are twisted and tied together by the knotter 24. The primary and secondary portions 20 and 43 are severed at the end of the tying operation. The entire knotting or tying operation takes place between successive strokes of the baler plunger 16.

Figure 6:
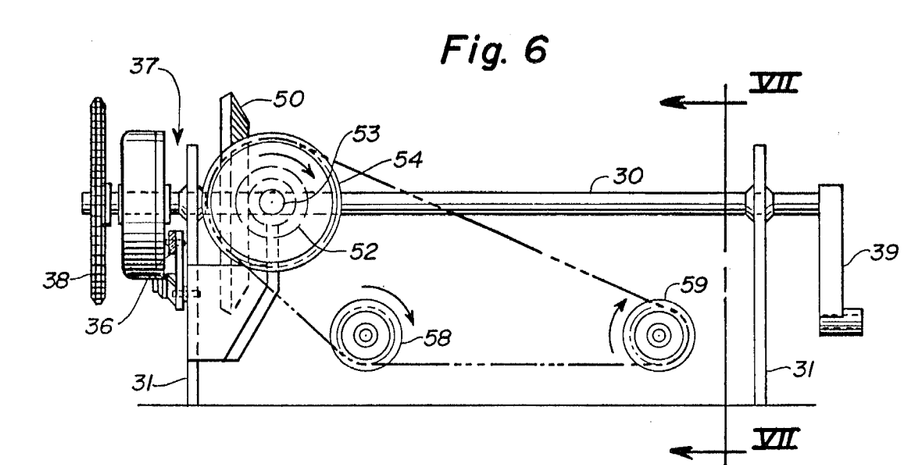
FIG. 6 is a view illustrating an embodiment of the knotter apparatus of this invention.
Figure 7:
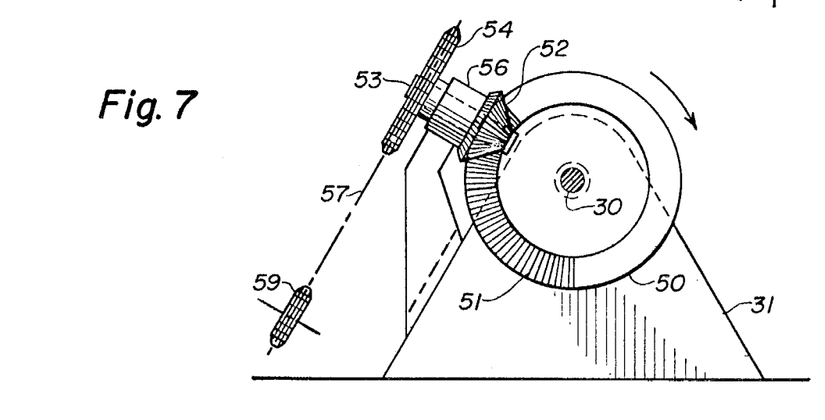
FIG. 7 is a view illustrating the knotter apparatus viewed along the line VII—VII of FIG. 6.

In FIGS. 6 and 7, the main shaft 30 also has attached thereto a single conical gear segment 50 having teeth 51 over only about ⅓ of its circumference. The gear teeth 51 are arranged to mesh with the teeth of a conical gear 52 which is mounted on one end of a stub shaft 53 on the other end of which is mounted a sprocket 54. The shaft 53 is journalled in a support 56. A chain 57 engages the sprocket 54 and sprockets 58 and 59 of the respective knotters 24.

As already stated, the two knotters 24 are identical, and, therefore, only one will be described in further detail in relation to the associated needle 23 and other components.

Figure 3:
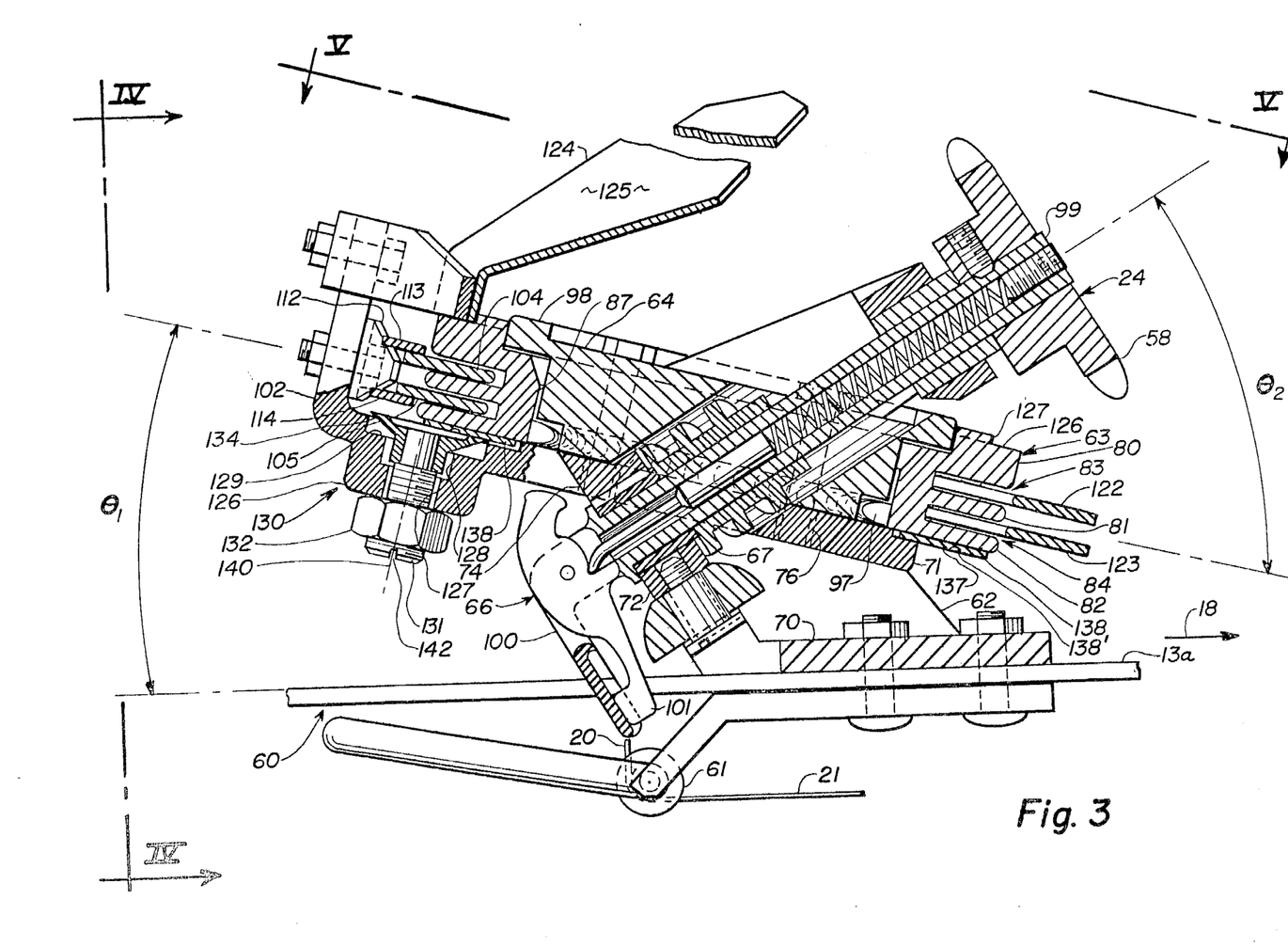
FIG. 3 is a sectional view illustrating an embodiment of the knotter apparatus of this invention.
Figure 4:
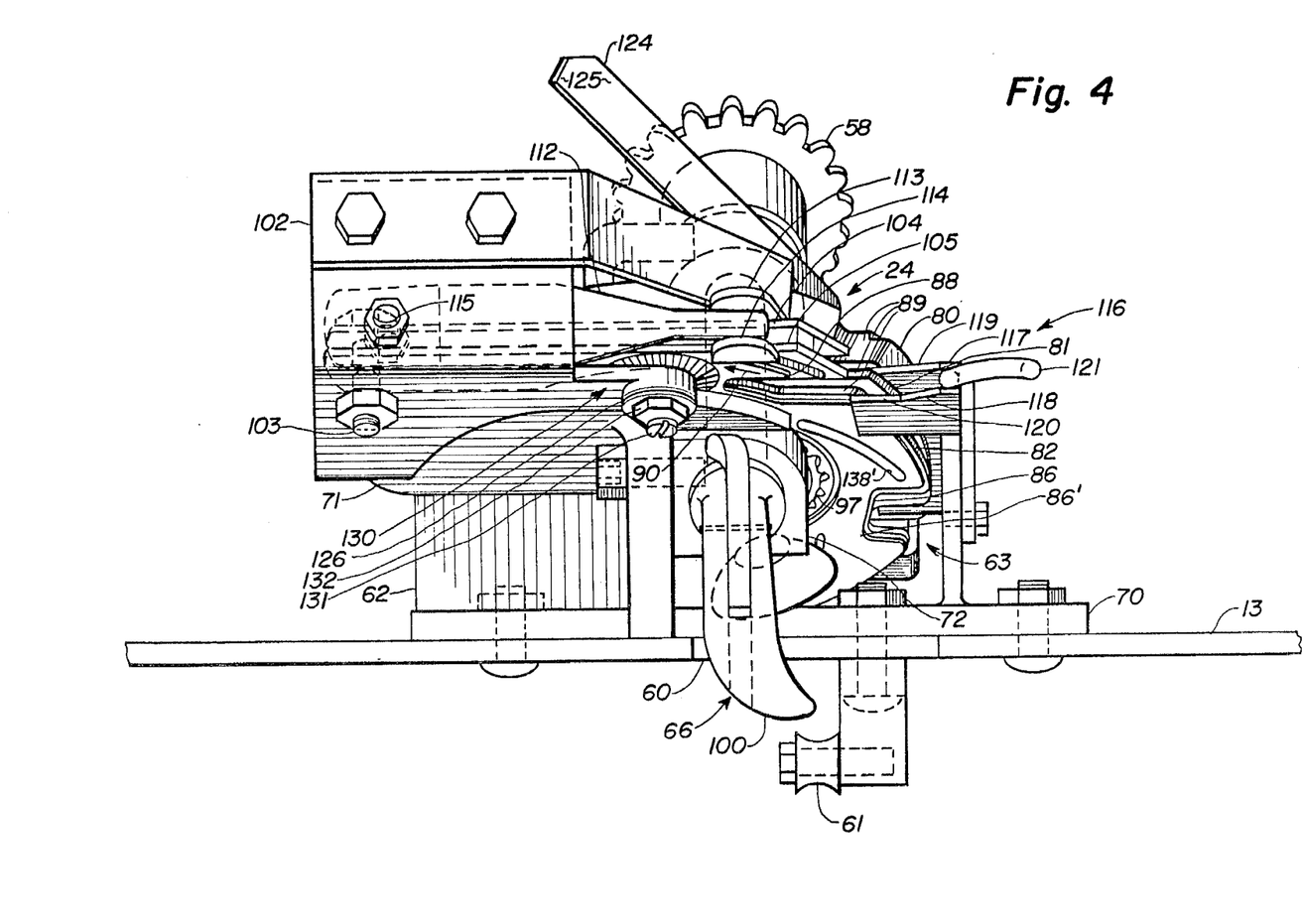
FIG. 4 is a view illustrating the knotter apparatus viewed along the line IV—IV of FIG. 3.

By way of general introduction of the knotter structure, attention is directed to the cross sectional view of FIG. 3 in which the basic, interrelated component parts can be seen. Each knotter 24 is mounted to the top wall 13a of the bale case 13 adjacent an elongate aperture 60 slightly rearwardly of twine guide rollers 61 (FIGS. 3 and 4). The knotter includes a base or a support frame 62, a generally circular, rotatable twine holder 63 rotatably mounted by a central hub 64 fixed to the support frame 62, a billhook 66 including a hollow shaft 99 extending angularly through, and rotatably supported by, the hub 64, and a worm gear 67 fixed to the billhook shaft in meshing engagement with internal gear teeth 97 on the twine holder 63. As mentioned above, and clearly seen in FIG. 3, for example, the twine holder 63 is maintained at an angle $\theta_1$ relative to the top wall 13a of the bale chamber 13. Though further discussion will be given below, it should be appreciated at this time that $\theta_1$ is an acute angle and allows for a better placement of the twine in the twine gripping area of the twine holder 63 by the needle 23. Also, as can be seen in FIG. 3, the billhook shaft 99 is positioned at angle $\theta_2$ relative to the twine holder 63. The angular relationship between the shaft 99 and the twine holder 63 permits the billhook 66 to be better disposed for the knot typing operation.

The support frame 62 includes a generally horizontal bottom plate 70 (FIGS. 3, 4 and 5) which is adapted to be removably affixed to the top wall 13a of bale chamber 13. A twine holder support plate 71 is attached to the bottom plate 70 at an angle $\theta_1$. A cylindrical bearing sleeve 72 is also supported by the bottom plate 70, adjacent the support plate 71. The support plate 71 has a recess cut therein adjacent bearing sleeve 72 to provide operational clearance for the worm gear 67. A plurality of apertures are provided in the bottom plate 70 for the convenient attachment thereof to the bale chamber 13. Threaded apertures 74 and 76 are provided in the support plate 71 for the attachment of the hub 65. It will be readily realized by one skilled in the art that the support frame 62 may be constructed of individual elements, or cast as a single unitary structure, or any combination thereof.

The twine holder 63 comprises a unitary structure with three generally circular flanges or discs 80, 81 and 82 which are laterally spaced one above the other in such a manner as to define respective slots or grooves 83 and 84 having a first depth. The flanges 80, 81 and 82 are generally annular in shape and of the same size although the flange 80 has a thickness greater than either flange 81 or 82. Each flange has at its periphery six equispaced notches 86 which are generally rectangular in shape and of a second depth which is substantially less than the first depth. Thus, the grooves 83 and 84 still have an effective depth even at the location of tge notches 86. Each notch 86 has a leading edge 88 and a trailing edge 89, with respect to the direction of rotation 90.

Each leading edge 88 lies along a radius struck from the geometric center of the flange whereas each trailing edge is angularly disposed with respect to a radius similarly struck from the center. In this manner, twine can readily enter each of the adjacent notches 86. The three flanges 80, 81 and 82 are slightly angularly offset relative to each other so that the notches 86 in one flange are slightly in advance (with respect to the direction of rotation 90) of the corresponding notches 86 in the flange immediately above. Thus, associated notches 86 in the flanges 80,81 and 82 defines grooves 91 to 96 (FIG. 5) which are inclined rearwardly with respect to the direction of rotation 90 at an angle of about 60 degrees relative to the planes of the flanges. All edges of the twine holder flanges 80,81 and 82 are rounded so as to avoid inadvertent cutting of the twine during operation.

Around the lower edge of the opening 87 in the twine holder 63 a continuous series of gear teeth 97 is provided, which teeth are adapted to mesh with the worm gear 67 on the billhook shaft 99. The twine holder 63 is held in position on the support 62 by a retainer ring 98 such that it is limited from undergoing any lateral or vertical movement, yet permitting rotation thereof. The billhook shaft 99 supports at one end the associated sprockets 58,59. The billhook 66 comprises a fixed jaw 100 and a movable jaw 101 positioned at about 90 degrees relative to the axis of the billhook shaft 99 and at the opposite end of shaft 99 which supports sprockets 58,59. Jaws 100, 101 and billhook 66 are generally known and are not described in any further detail.

Figure 5:
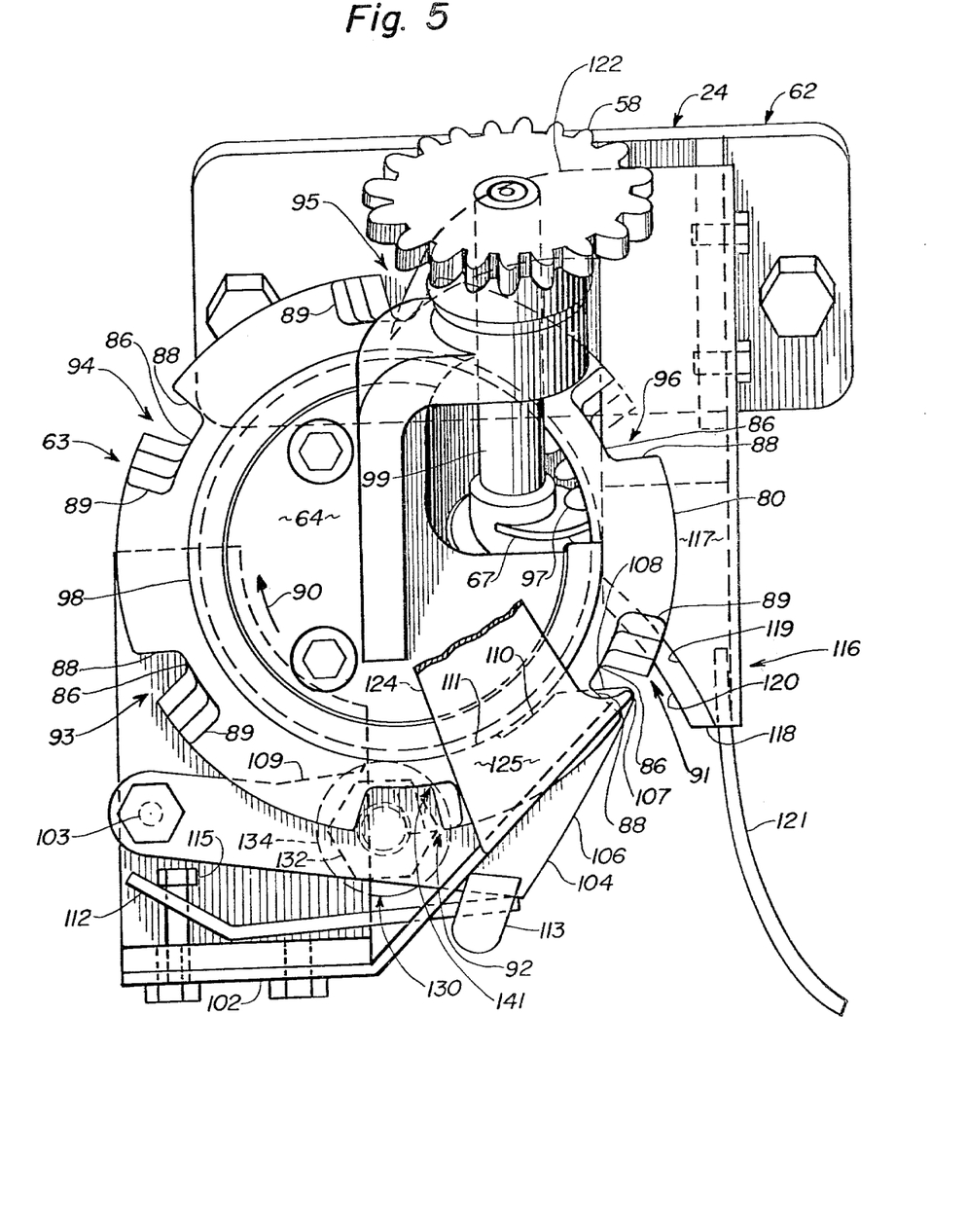
FIG. 5 is a view illustrating the knotter apparatus taken along the line V—V of FIG. 3.

A further support member 102 is provided on base 62 with a pivot 103 at one side of the twine holder 63 for pivotally mounting a pair of twine retaining fingers 104 and 105, which are integrally connected at one end. The twine fingers 104 and 105 extend from the pivot 103 in a transverse direction across the twine holder 63 and extend in part into the grooves 83 and 84, respectively. Each finger 104 and 105 has a curved edge 106 opposite the pivot which edge acts as a twine guide, assisting in the positioning of the secondary portion 43 of the twine in the groove 91 as seen in FIG. 5. The edge 106 partly defines a generally hooked end 107 of the finger which, at least in the upper finger 104, has a straight edge 108 which also acts as a twine guide. The edges of the fingers 104 and 105 facing towards the twine holder 63 and extending between the flanges thereof each comprise a straight section 109 and a curved section 110, separated by a curved section 111 of a smaller radius than section 110 (FIG. 5). The fingers 104 and 105 are resiliently urged into grooves 83 and 84 by a leaf spring 112. The leaf spring 112 is secured at one end adjacent the pivot 103 to the upturned edge of the support member 102 and extends in the direction of the fingers 104 and 105 and contacts the same between ears 113 and 114 adjacent the edge 106 of the twine fingers. An adjustable screw 115 (FIG. 5), mounted on support member 102, provides adjustment of the pressure exerted by the spring 112 on the fingers 104 and 105.

A first stationary twine guide 116 (FIGS. 4 and 5) is fixed to the support frame 62 adjacent a side of the twine holder 63 and includes a pair of parallel spaced apart plates 117 and 118 which extend partially into the grooves 83 and 84, respectively, of the twine holder 63 and terminate forwardly in guide edges 119 and 120. A curved guide extension 121 is fixed to the twine guide 116 and directed forwardly and away from the knotter mechanism 24. The extension 121 and guide edges 119 and 120 cooperate to direct twine inwardly towards a twine-gripping area (best seen in FIG. 5) defined by the groove 91 and the twine retaining fingers 104 and 105. The guide 116 terminates rearwardly in a pair of spaced-apart twine disc cleaners 122 and 123 which extend into the grooves 83 and 84, respectively, to remove any material therein and direct it away from the knotter 24.

Projecting from the upturned edge of the support member 102 in a rearward direction partially above the twine holder 63 is a second stationary twine guide 124 comprising a guide surface 125 operable to guide twine towards the twine gripping area referred to above.

Figure 8:
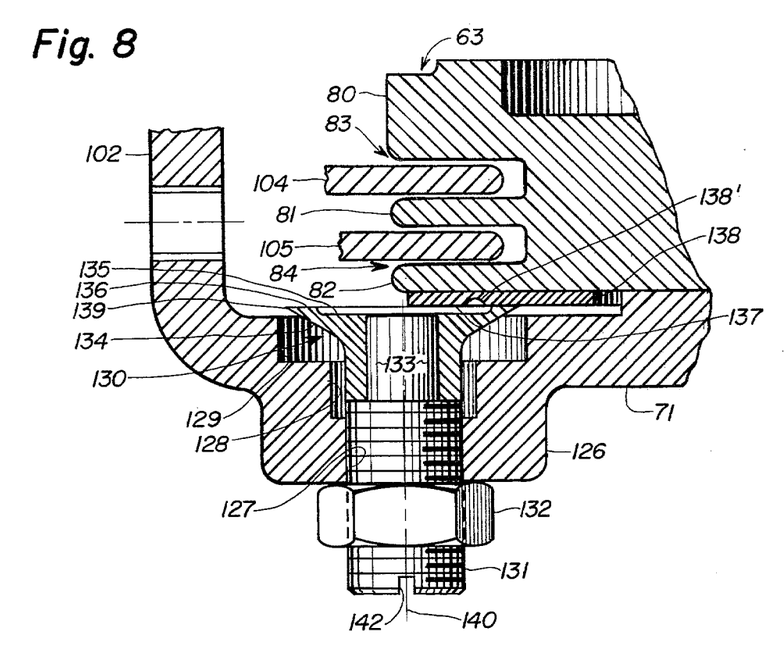
FIG. 8 is an enlarged view illustrating an embodiment of the rotary knife of FIG. 3.
Figure 9:
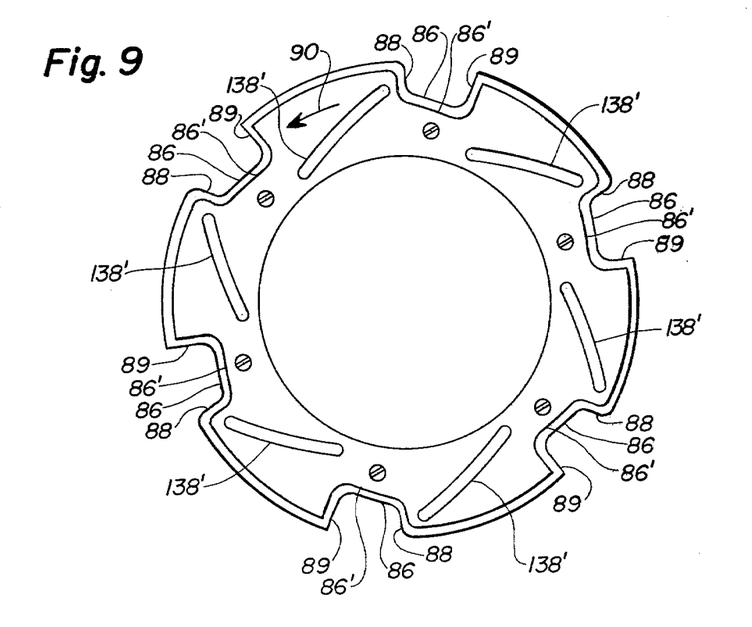
FIG. 9 is an enlarged view illustrating an embodiment of the shearplate of this invention.

The support member 102 is provided with a boss 126 and a bore 127 and is counterbored at both 128 and 129. The bore 127 is threaded and receives rotary knife means 130 (best seen in FIG. 8) by way of a threaded spigot 131 of the latter which is held in an adjusted position by a locknut 132. One end of the spigot 131 is formed with a stub shaft 133 of smaller diameter on which is rotatably mounted a rotary knife 134. The knife 134 is frusto-conical and has a recess 135 in the base which leaves comparatively narrow annular area 136 for cooperation with a shear surface 137 of a shear plate 138 in the form of an annulus secured to the underside of the flange 82, a knife edge 139 being formed around the periphery of the base. The shear plate 138 is of hardened metal with sharp edges and is formed with notches 86' (FIG. 9) complementary to, and aligned with, the notches 86 in the flange 82, although of slightly larger size to prevent inadvertent cutting of the twine by the sharp edges when the latter is moved relative to a notch 86 in the flange 82, as it is during part of the knot tying operation. It has been found that an insert of 2 mm is sufficient to prevent inadvertent twine cutting and yet effect positive cutting at the required time. The underside of the shear plate is provided with parthelical cleaning grooves 138' (best seen in FIGS. 4 and 9) which serve to remove any foreign matter which may tend to collect in that area.

The axis of rotation 140 of the knife 134 is offset from the path of the twine portions 20 and 43 which are to be severed by the knife as will be appreciated from FIG. 5. The twine portions 20 and 43 in fact are held in the corner 141 of the notch 86 of the flange 82 associated with knife 134 during the twine cutting operation. The relatively small surface of the annular area 136 of the knife which cooperates with the shear surface 137 helps to ensure a precise cutting operation as it reduces the likelihood of non-planar characteristics and/or irregularities of the cooperating surfaces interferring with the cutting action. The scissor action of the knife 134 and shear surface 137 is enhanced by rotary movement of the knife during the cutting operation which results in the twine portions 20 and 43 actually sliding along the knife edge. Rotary movement is imparted to the knife 134 by the action of the twine portions 20 and 43 engaging the same as they are moved along their paths by the twine holder 63, i.e., in the direction 90. The loading of the knife 134 on the shear surface 137 is adjusted by loosening the locknut 132 and screwing the spigot 131 in the appropriate direction for which purpose it is provided with a slot 142.

With the parts assembled as set forth above, the baler is moved across a field and crop material such as hay to be baled, is picked up from the ground with the pickup mechanism 11 and is delivered thereby to the feeder mechanism 12 which in turn feeds the crop material in successive batches or charges into the bale chamber 13 in timed sequence with the reciprocating baler plunger 16. The plunger 16 compresses the crop material into a bale 14 and at the same time gradually advances the bale towards the outlet 17 of the baling chamber in the direction of arrow 18. As long as the clutch mechanism 37 is not actuated, all components of the knotters 24 are in their rest portions. This means that the needles 23 are in their lowermost dwell position, as shown in full lines in FIG. 2, while the billhook 66 projects downwardly, as seen in FIG. 4. As already mentioned, a primary portion 20 of twine 21 extends across the bale chamber 13 in the path of the leading end of the bale 14 being formed and passes through the eye of the needle 23, with the free end of the primary portion being supported in the twine holder 63 of the associated knotter 24, bearing in mind that two knotters are employed, whereby each bale 14 is bound by two pieces of twine. The free end of the primary portion 20 of the twine 21 is received in a groove 92 of the twine holder 63 and passes across the top of the twine holder and down into the next groove 91 (arising from the knotting operation in relation to the previous bale) and is firmly held in position by the retainer fingers 104 and 105 in cooperation with the flanges 80,81 and 82.

As a bale 14 is being formed and moved along the bale chamber 13, the starwheel 33 is rotated thereby and as the bale reaches a predetermined length, the wheel 33 actuated the clutch mechanism 37, whereupon the main shaft 30 is rotated through 360 degrees by the chain and sprocket drive mechanism. During the first 180 degrees of rotation of the shaft 30, the crank arm 39, the pitman 40 and the needle frame 41 are pivoted whereby the needles 23 move from their lowermost rest positions to their highest, full throw, positions (phantom lines in FIG. 2). Simultaneously, the baler plunger 16 is moving towards its extreme material compressing position. The needles 23 move upwardly through the bale chamber 13 and through slots (not shown) in the fact of the plunger 16, whereby the plunger holds the crop material to be baled away from the needles 23 but enables a smooth and unobstructed passage for the needles 23 through the bale chamber 13 and prevents bending and/or breakage of the needles 23. During the next 180 degrees of rotation of the main shaft 30, the needles 23 are retracted and returned to their rest or dwell positions. At the same time, the plunger 16 is retracted. During the initial movement over 120 degrees of the main shaft 30, teeth 51 of the gear segment 50 are not in mesh with the teeth of the conical gear 52, whereby neither knotter 24 is operated.

During the initial movement of the shaft 30, each needle 23 carries the end of the secondary twine portion 43 of the twine 21 from the position shown in full lines in FIG. 2 around the bottom and trailing end of the bale 14 to the position shown in phantom lines in FIG. 2 in which the top of each needle 23 projects through the aperture 60 in the bale chamber top wall at a location generally forwardly of the associated knotter 24 and slightly offset to the left relative to the billhook 66 thereof and relative to the center of the twine holder 63. At that moment, the needle 23 places the end of the secondary twine portion 43 in the groove 91 positioned above and slightly rearwardly of the billhook 66 and adjacent the primary end portion 20 already positioned therein. Also at that moment the secondary twine portion 43 is oriented substantially in the direction of the groove 91 of the twine holder 63 at the apex of the V defined by the stationary guide members 116 and 124. Hence, the twine portion 43 is readily located in the groove 91. The end of the secondary twine portion 43 is held against the trailing edges 89 of the notches 86 while the end of the primary portion 20 is held against the leading edges 88 thereof. The guide surface 125 of the stationary guide 124, guide extension 121 and guide edges 119 and 120 of the stationary guide 116, and edges 106 of the twine retainer fingers 104 and 105 thus cooperate with the edges of the twine disc flanges 80,81 and 82 in guiding the end of the secondary twine portion 43 into the appropriate position in groove 91.

The gear segment 50 then meshes with the conical gear 52, whereby the billhook shaft 99 and the twine holder 63 start rotating in the direction 90. The transmission ratios are such that for a 60 degree rotation of the main shaft 30, the billhook shaft 99 is rotated through 360 degrees and the twine holder 63 is rotated through only 30 degrees.

As the twine holder 63 is rotated over said 30 degrees in the direction 90, the ends of the primary and secondary twine portions 20 and 43 held in the groove 91 are caused to move in the same direction and towards the twine retainer fingers 104 and 105. The edges 108 on the twine retainer fingers 104,105 wedge the twine portions between the fingers and the flanges 80,81 and 82. After no more than 15 degrees of rotation of the twine holder 63, the end of the twine portions 20 and 43 are strongly caught and held between the fingers and the flanges and only can slide therebetween under a substantial load. This firm grasp on the two portions of twine is held over about 30 degrees of rotation of the twine holder 63. Thereafter, the ends of the twine portions 20 and 43 are moved between the sections 111 of the retainer fingers 104,105 and the flanges 80,81,82 which increases the area of contact between the various components and the twine so that the grasp on the latter is further increased to the extent that the twine portions can no longer slide between the components. The free end of the primary twine portion 20, which initially was held between the flanges 80,81,82 and the sections 111 on the twine fingers 104,105 moves past the sections 111 substantially at the same moment as the ends of the twine portions 20 and 43 move between the flanges and the twine retainer fingers at the location of the hooked ends 107 of the fingers.

As already mentioned, as the twine holder 63 is rotated over the first 30 degrees of its movement, the billhook shaft 99 is rotated over a first full cycle of 360 degrees. This is followed by a second full cycle of 360 degrees to complete the knot-tying operation, the details of which are not, in the main, pertinent to the present invention and will not, therefore, be given.

During the final 180 degrees movement of the second 360 degrees cycle of the billhook shaft 99, the twine holder 63 is rotated further, thereby moving the ends of the twine portions 20,43 to the sections 111 of the retainer fingers 104 and 105 so that, as explained, the grasp on the twine portions is increased substantially to the extent that the ends are no longer allowed to slide inbetween the various components even under an increased tensile load. As the twine holder 63 moves to its next following rest position, the groove 91 holding the twine portions 20 and 43 moves past the rotary knife means 130, whereby both portions of twine are severed, leaving the formed bales 14 independent as such although the looped ends of the twine portions are still retained on the billhook 66.

More specifically, the twine portions 20 and 43 engage the knife edge 139 as they are being held extremely tightly in the corner 141 of the relevant notch 86 of the flange 82 and moved towards the knife by movement of the twine holder 63. The twine portions 20 and 43 then get pushed beneath the lower surface of the flange 82 towards the shear plate 138 by the combined action of the knife edge 139 and the twine holder movement until the knife edge engages the shear surface 137 and the cutting operation commences. The engagement of the knife edge 139 by the twine portions 20 and 43, particularly when the twine portions engage the shear plate, causes rotation of the knife 134 so that the knife edge 139 then moves relative to the twine portions thus enhancing the cutting action which takes place primarily between the knife edge and the edge of the shear surface 137. Also, the knife rotation results in a different area of the knife edge 139 being presented for the next cutting operation, whereby the incidence of blunting is much relieved besides the fact that the knife is to some extent self-sharpening by virtue of its sliding cooperation with the surface 137 of the hardened shear plate 138.

The cutting of the primary twine portion 20 gives rise to a short piece of twine and if this does not fall from between the discs 80,81 and 82 during the formation of the subsequent bales, the twine disc cleaners 122 and 123 will remove it.

As the knot-tying operation approaches completion, the primary twine portion for the next bale, which is held in the next following groove 96 and which extends over the top of the twine holder 63, engages the section 111 of the fingers 104 and 105, so that when a tensile load is exerted on the twine during the formation of the following bale, that twine portion is firmly held and does not slip.

The provision of a separate hardened shear plate 138 also means that the twine holder can be made of a softer, and, therefore, less expensive, material than would be the case if the twine holder had to provide the shear surface. The shear plate 138 could be split into separate shear members disposed adjacent the respective trailing edges 89 of the notches 86 in the twine disc 82. The hardened shear plate 138 also improves the self-sharpening of the knife 134 as it slides thereover and achieves a more consistent twine cutting operation as the sharp edges give a better scissor effect in conjunction with the knife.

The foregoing has described a rotating knife having a cutting edge in knife sharpening engagement with a shear plate. The plate includes cleaning grooves for removing debris from between the knife and the plate.

It is anticipated that aspects of the present invention other than those specifically defined in the appended claims, can be obtained from the foregoing description and the drawings.

Having thus described the invention, what is claimed is:

1. A knotter apparatus comprising:
   a twine holder including a plurality of rotating twine discs, said discs defining a plurality of sets of notches;
   a shear plate connected to rotate with said twine discs, said plate defining notches substantially aligned with said disc notches;
   a knife connected to said twine holder having a cutting edge in knife sharpening engagement with said shear plate; and
   said shear plate further defining a plurality of cleaning grooves.

2. The apparatus of claim 1 wherein the cleaning grooves are between the knife cutting edge and the shear plate.

3. The apparatus of claim 2 wherein the grooves are arcuate and defined along a helical path extending radially outwardly along a radial face of said plate.

4. The apparatus of claim 1 wherein said disc notches are of a first size and said plate notches are of a second size greater than said first size.

5. The apparatus of claim 1 wherein edges of said plate notches are spaced from edges of said disc notches at a distance of about 2 mm.

6. The apparatus of claim 1 wherein said plate is formed of a hardened metal sufficient for said knife-sharpening engagement with said cutting edge of said knife.

7. A knotter apparatus comprising:
   a twine holder including a plurality of rotating twine discs;
   a shear plate connected to rotate with said discs;
   a knife connected to said twine holder having a cutting edge in knife sharpening engagement with said plate; and
   means for removing debris from between said knife and said plate, said means being a groove formed between said cutting edge and said shear plate.

* * * * *